Figure 1:
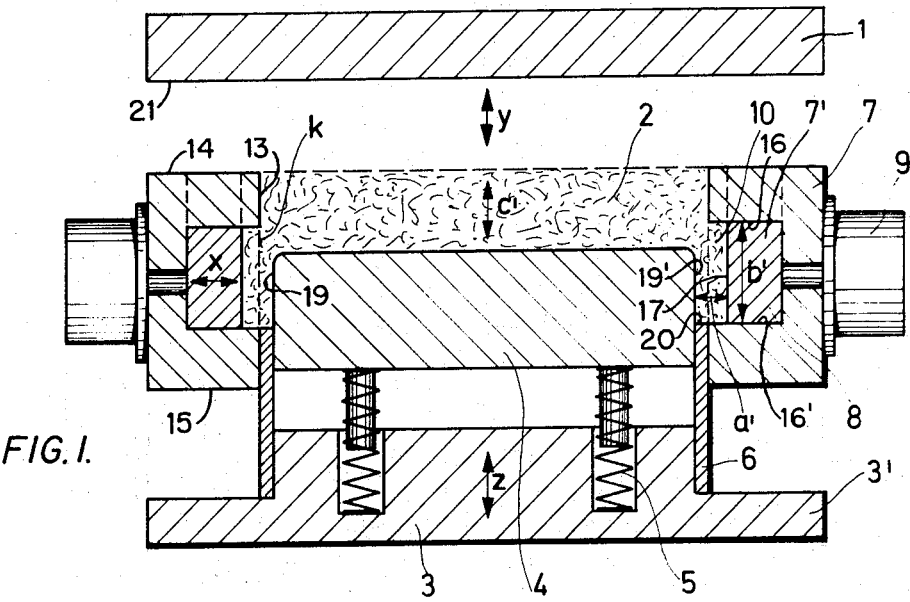

United States Patent

[11] 3,632,276

[72] Inventor Edmund E. Munk
 Oberstenfeld, Germany
[21] Appl. No. 819,880
[22] Filed Apr. 28, 1969
[45] Patented Jan. 4, 1972
[73] Assignee Furnier- & Sperrholzwerk J.F. Werk
 Jr.K.G. Werzalit-Pressholzwerk
 Oberstenfeld, Germany

[54] MOLD FOR PRODUCING MOLDED ELEMENTS WITH PARTS OF DIFFERENT THICKNESSES FROM FIBROUS MIXTURES
 5 Claims, 2 Drawing Figs.

[52] U.S. Cl.................................................. 425/415,
 425/417, 425/419
[51] Int. Cl.................................................. B29j 5/00
[50] Field of Search......................................... 18/16 M,
 16.7, 16.5, 5 M; 25/DIG. 31

[56] References Cited
 UNITED STATES PATENTS

| | | | |
|---|---|---|---|
| 1,624,904 | 4/1927 | Claus............................ | 18/16.7 X |
| 2,499,530 | 3/1950 | Scott............................ | 18/16.5 |
| 2,831,212 | 4/1958 | Belden.......................... | 18/16.7 |
| 2,979,770 | 4/1961 | Greene et al................... | 18/16 M X |
| 3,097,411 | 7/1963 | Gerster et al.................. | 18/16.5 X |
| 3,166,617 | 1/1965 | Munk............................ | 18/16 M X |
| 3,200,442 | 8/1965 | Haller........................... | 18/16.5 |
| 3,261,897 | 7/1966 | Munk............................ | 18/16 M X |

*Primary Examiner*—J. Howard Flint, Jr.
*Attorneys*—Leslie G. Noller, John M. Crawford and Kenneth W. Vernon ABSTRACT: A mold for producing especially plate-shaped elements each of which is provided with a flange or wall portion projecting from one or more of its lateral edges from a mixture of comminuted fibrous materials and a binder, preferably of hot-setting synthetic resins, wherein the part of the mold chamber in which the thin lateral wall portion or portions are molded has a considerably greater width than the final thickness of this wall portion and thus permits the molding mixture to be easily filled uniformly into the entire mold chamber. The mixture in the lateral downwardly projecting chamber part or parts is then first compressed by lateral, horizontally moving dies to the final thickness of the wall portions, whereupon several lower dies are moved independently of each other to press against the thin lower ends of the precompressed wall portions and against the lower side of the material in the main part of the mold chamber to compress the material in the entire mold chamber to the dimensions and shape of the final product.

PATENTED JAN 4 1972

3,632,276

Edmund E. Munk
INVENTOR.
BY John B. ...

MOLD FOR PRODUCING MOLDED ELEMENTS WITH PARTS OF DIFFERENT THICKNESSES FROM FIBROUS MIXTURES

The present invention relates to a mold for producing molded elements of a more intricate shape from a mixture of comminuted fibrous materials, for example, wood chips, and a binder, for example, of hot-setting synthetic resins, and more particularly the invention relates to such a mold for producing such molded elements of a substantially platelike shape wherein each element various in thickness or height especially by being provided at least at one end with a wall-like portion which is preferably relatively thin but has a relatively great height from the plate-shaped part.

Since the mixture to be molded has to be strongly compressed during the molding operation, the mold chamber must have a volume so as to permit an amount of this mixture to be filled therein which depends upon the desired dimensions of the different parts of the element to be molded and their compression ratio which may amount, for example, to 5 to 1. With molding mixtures of this type it is, however, impossible to fill the molding mixture, for example, by hand, into a fixed mold in such a manner that, if the molded product should have abrupt, steplike changes in thickness or height, the mixture will be so uniformly distributed in the different parts of the mold that a uniform rate of compression may be attained by the molding operation. For this reason, it has in the past generally been necessary to avoid abrupt or steplike changes in the dimensions of a molded product which was made of fibrous mixtures and to make these changes more gradual. If the changes from one wall thickness to another were made too abrupt, the result occurred that in the molding operation of an angular element the area adjacent to the inner corner between two adjacent parts was excessively compressed, while the opposite outer corner of the thicker part was insufficiently compressed. The degree of solidity of the molded elements was therefore uneven which affected their stability and also caused considerable difficulties when trying to mold covering layers, for example, of resin-impregnated paper, directly upon the molded elements since due to the insufficient back pressure by the insufficiently compressed parts of the molded element the covering layer was not intimately combined with these parts, while at overcompressed parts of the molded element the pressure upon the covering layer caused the latter to be marked or even damaged.

In order to overcome these disadvantages, efforts were made by the use of limiting inserts to produce molded elements with different wall thicknesses by several successive mold-filling and compressing steps. When employing such a method especially in a hot-molding press, it is, however, impossible to attain a homogeneous combination of the molding materials which are filled into the mold for the different molding stages. Furthermore, after the limiting inserts are removed from the mold, the fibrous mixture which is subsequently added has the tendency to yield laterally during the compressing operation so that the purpose of this method of attaining a uniform compression ratio will not be fulfilled at the corner areas of the molded elements.

As disclosed, for example, by the German Pat. No. 1,165,250 there is another molding method known in which the mold is provided with a plurality of dies which are movable independently of and in opposite direction to each other partly from above and partly from below into and out of the mold chamber. The dies which are movable downwardly from the mold chamber for filling the latter are offset relative to each other in such a manner that on each of them an amount of molding mixture has to be deposited which has a thickness equal to the required multiple of the respective wall portion of the molded element.

This method has the disadvantage that in those cases in which, for example, a part of a molded element should have a small width but a considerable thickness or height, a relatively narrow die has to be retracted very far downwardly in order to attain the desired compression ratio during the molding operation, and that it is very difficult to fill the fibrous mixture at a uniform rate of distribution into this narrow but deep chamber area. Such a change from a small to a great wall thickness or height frequently occurs at the outer edges of molded plate-shaped elements.

It is an object of the present invention to overcome the mentioned difficulties and disadvantages of the known molds for molding fibrous mixtures so as to produce especially plate-shaped elements the outer edges of which are provided with thin projecting flanges or wall portions of a height considerably exceeding the thickness of the plate-shaped parts, to make these thin but relatively high parts of a uniform consistency and compression ratio, and, if necessary, to permit the corners between them and the plate-shaped parts to be made relatively sharply angular.

According to the present invention these objects are attained by providing the mold not only with upper and lower vertically movable dies and with a stationary or vertically movable mold frame, but in addition with one or more dies which are movable laterally within the frame and permit the part of the mold chamber into which the amount of fibrous mixture has to be filled which is required for molding each of the thin or narrow flanges or wall portions to be made of a width and volume which is a multiple of the width and volume of the flange or wall portion in its final compressed condition. In using this mold all of the dies of the mold are retracted for such distances from their final compressing positions that the entire mold chamber is free for receiving the molding mixture and this mixture may be easily filled into the molded chamber from above, Since according to the invention the laterally movable die permits the extension of the chamber which is required for receiving the amount of material which is necessary for molding the thin or narrow but relatively high wall portion to be made considerably wider but less deep than required by the known molds and molding methods, there are now no difficulties in filling the molding mixture uniformly into the entire mold chamber including its extension from the open upper side of the chamber. After the entire mold chamber has been filled with the molding mixture, the upper die is at first lowered upon the mold frame so as to close the mold chamber completely. Then as the next step in the molding operation, the lateral die or dies are moved inwardly into the chamber extension so as to compress the molding mixture therein to the final width or thickness of the downwardly projecting wall portion. According to one embodiment of the invention, each of the lower dies is thereafter moved upwardly within the stationary frame to its final position in accordance with the desired final thickness or height of the platelike part and of the wall portion on one or both of its lateral ends which has been precompressed by the lateral die or dies. Instead of moving the lower dies upwardly after the mold chamber has been filled, the upper die has been lowered upon the mold frame, and the lateral die or ides have been moved toward the inside of the frame so as to compress the molding mixture for the wall portion or portions to their final thickness, the molding action of the lower dies may also be attained by moving the upper die further downwardly after the lateral die or dies have been moved to their final compressing position. The upper die then moves the mold frame downwardly and compresses the molding mixture from above against the upper end lower dies. According to another feature of the invention which is applicable in a similar manner to either of its embodiments, it is advisable to interpose resilient means, for example, a plurality of compression springs between the main lower die or dies for molding the platelike part and a common plate to which the narrow lower dies are rigidly secured and which is either movable upwardly or forms a stationary base. These springs retard the compressing movements of the main lower die or dies relative to that of the narrow lower dies.

Figure 2:
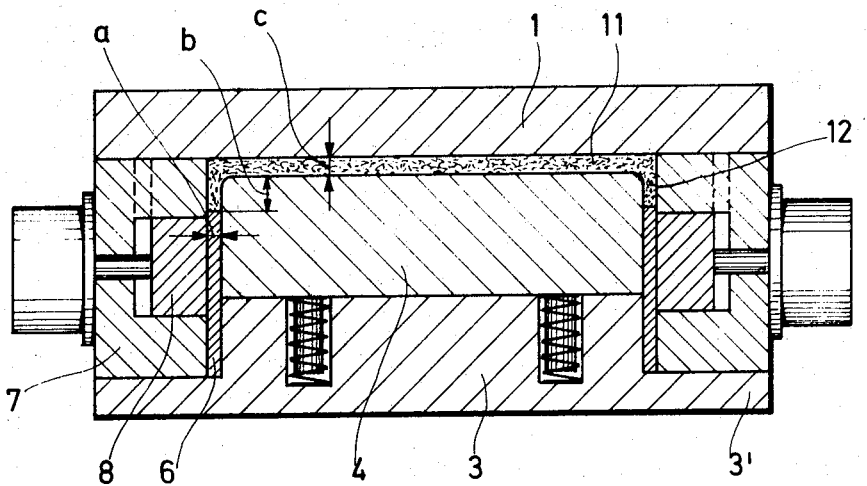

These as well as additional features and advantages of the present invention will become further apparent from the following detailed description thereof which is to be read with reference to the accompanying drawings, in which:

FIG. 1 shows a vertical section of a mold according to the invention in the open position after being filled, while FIG. 2 shows a vertical section of the same mold in the closed and fully compressing position.

FIG. 1 of the drawings illustrates a mold according to the invention in the open position after the upper die 1 has been moved upwardly from the lower mold and the molding mixture 2 has been filled from above into the mold chamber. The lower dies which according to one embodiment of the invention are movable in the upward direction toward the molding mixture 2 comprise a supporting element 3 above which the lower main die 4 is located. This main die 4 is movably connected to the supporting element 3 by several compression springs 5 so that when during the molding operation the supporting element is moved upwardly, it will at first move the main die 4 upwardly, it will at first move the main die 4 upwardly at a lower speed until it engages upon the main die 4. The supporting element 3 further carries narrow dies 6 which extend vertically to the plane of the drawing and are rigidly secured to the supporting element 3. The mold according to the invention further comprises a frame with opposite frame walls 7 having inner faces 13. Recesses 7' are formed in the frame walls 7 extending outwardly from faces 13 in which lateral dies 8 are movable horizontally in the direction of the double arrows X. As illustrated in full lines in the drawings, the frame walls 7 may be of a substantially U-shaped cross section and the lateral dies may be guided by the upper and lower faces 16 and 16' of the recesses. According to a modification of the invention as indicated diagrammatically by dotted lines, the recess in each frame wall 7 may extend to the upper face 14 thereof. In this case, each lateral die would be guided by the lower guide face 16' of the recess and by parts of the lower surface 21 of the upper die 1 after the latter has been moved down upon the upper surfaces of the frame walls 7 so as to close the mold chamber. The driving means for moving the upper die 1 and the lower die elements 3, 4, and 6 are not illustrated in the drawings. The lateral dies 8 are preferably driven by hydraulic or pneumatic means 9, as illustrated diagrammatically and each of these dies 8 may be driven, for example, by two of these driving means. The double arrows y and z indicate respectively the directions of the movements of the upper die 1 and of the supporting element 3 and the lower dies 4 and 6.

In using the mold, two different methods may be employed. According to one of these methods as indicated in the preceding paragraph, the vertical molding pressure by the lower dies 4 and 6 is exerted by the upward movement of the supporting element 3 and the resulting movement of dies 4 and 6, in which event the frame walls 7 are stationary, while according to the other method the vertical molding pressure is exerted by the upper die 1 toward the lower dies 5 and 6, in which event the frame walls 7 are vertically movable and depressed by the upper die 1, for example, against the action of springs, while the supporting element 3 which carries the lower dies 4 and 6 is stationary.

According to either of these methods, the loose molding mixture 2 is poured into the opened lower mold, whereby the lateral chamber areas 10 may also be easily and uniformly filled which are limited by the front faces 17 of the lateral dies 8, the part of the horizontal wall surface or surfaces of the recess in front of each retracted lateral die 8, the top faces 20 of the narrow lower dies 6, and the parts of the lateral side faces 19, 19' of main lower die 4 which project above the top faces 20 of the narrow dies 6. These chamber areas 20 may be filled completely without difficulties since they are considerably wider than the final width a of these areas and of the wall portions 12 of the molded element, as may be seen by a comparison between FIGS. 1 and 2. The volume of the lateral chamber areas 10 of the open mold is indicated by the arrows a' and b' in FIG. 1 in which the width a' amounts, for example, to 2½ times and final width a of each wall portion 12 of the molded element. The total volume of each chamber area 10 is therefore equal to five times the final volume of each wall portion 12. The molding mixture 2 which is poured from above into the mold chamber upon the upper surface 18 of the main die 4 has a height c' which is likewise approximately equal to five times the final thickness c of the main part of the molded element.

After the entire mold chamber has been completely filled, the upper die 1 is moved downwardly for the required distances so as to engage upon the upper faces 14 of the frame walls 7 which in any event are maintained at this time in a fixed position either by being stationary at all times or, for example, by being supported by springs, not shown, on the supporting element 3 which is then held in a stationary position. As soon as die 1 abuts against the frame walls 7 and thereby closes the mold chamber, the opposite lateral dies 8 are moved to their final positions as indicated by the dotted lines k. The pressure face on front face 17 of each lateral die 8 is then spaced from the adjacent side face 19 or 19' of the lower main die 4 at a distance equal to the final thickness a of the wall portion 12 of the molded element. The molding mixture 2 which was previously filled into each chamber part 10 is thereby compressed approximately to two-fifths of its original volume. After the lateral dies 8 have reached their final inner positions, the molding mixture 2 in the main mold chamber and the precompressed mixture in the chamber parts 10 will be compressed by the main lower die 4 and by the narrow lower dies 6. As previously mentioned, this may be accomplished either by moving the supporting element 3 upwardly and by thereby also moving the lower dies 4 and 6 relative to the stationary frame walls 7 and to the upper die 1 which is then maintained in a fixed position on these frame walls or by moving the upper die 1 further downwardly which then depresses the frame walls 7, for example, against the action of springs (not shown), and compresses the molding mixture 2 from above against the back pressure of the main lower die 4 and of the narrow lower dies 6 on the stationary supporting plate 3.

Assuming that the mold is designed so that the supporting plate 3 is movable upwardly, while the frame walls 7 are stationary and covered by the upper die 1 in a fixed position, the upward movement of the supporting plate 3 is directly transmitted to the narrow dies 6 which then act upon the lower ends of the laterally precompressed wall portions, while due to the compression springs 5 the upward movement of the supporting plate 3 will at first result in a slower compressing movement of die 4 until springs 5 are so far compressed that the upper surface of the supporting element 3 abuts against the lower surfaces of die 4, whereupon all lower dies 4 and 6 are moved together until the flanges 3' abut against the lower surfaces of the frame walls 7. Springs 5, the number of which depends upon the size of die 4 must have such a strength that the force which is exerted by all of them is smaller than the force which is exerted by the back pressure of the molding mixture upon the die 4 during the first part of the upward movement of supporting plate 3. Springs 5 therefore retard the upward movement of die 4 relative to the upward movement of the narrow dies 6 which are rigidly secured to plate 3. When the lateral flanges 3' abut against the lower surfaces 15 of the frame walls 7, as shown in FIG. 2, the narrow wall portions 12 and the main part 11 of the molded element will have their predetermined sizes, shapes and densities. If the lateral dies 8 do not have a height, as indicated by the dotted lines in FIGS. 1 and 2, so as to be guided by the lower surfaces of the recesses in frame walls 7 and by parts of the lower surface 21 of the upper die 1 which then engages upon the remainder of the upper surfaces 14 of frame walls 7, but if they have a height b' and are guided by the upper and lower surfaces of the recesses as shown in full lines in the drawings, the upper end surfaces of dies 6 will at the end of the molding operation be located at a short distance above the upper surfaces of the recesses. The molded element then consists of the wide platelike central part 11 of a small thickness c which is limited at its opposite ends by the wall portions 12 of a small thickness a and a greater height b.

When the molding operation is completed and the binder in the molding mixture has preferably been set, for example, by heating the mold, preferably while the molding operation is being carried out, the dies 1, 4, 6, and 8 are retracted to their initial positions and the molded element is removed from the mold.

The important feature of the invention of providing the lateral dies 8 in addition to the narrow vertical dies 6 has not only the advantage that they permit the chamber parts 10 to be made of a considerably greater width and lower height than those which were previously required when only narrow vertical dies of a great length were provided, and that these chamber parts 10 may therefore be filled with the molding mixture 2 very uniformly and without any difficulty even by hand, but it has the further important advantage that the total force which is required to compress the molding mixture in these chamber parts 10 first in lateral directions to the final width or thickness of the desired wall portions and then in a vertical direction to the desired length is considerably less than that which was required in the known method for compressing the molding mixture in a very long or high chamber part solely in vertical direction to the final height and compression ratio of the desired wall portion. Furthermore, it is quite obvious that by first exerting the molding pressure upon the much larger lateral side of the molding mixture in the chamber part 10 and by then only exerting a vertical pressure upon the narrow and relatively short wall portion to attain the desired height thereof, the finally molded material of the wall portion will have a much more uniform density than if the compression is only exerted in a vertical direction upon the molding mixture in a narrow but very high chamber part. Aside from these advantages, there is still another which might even be the most important. When the molding mixture 2 is filled into the entire mold chamber, the fibers of this mixture have the tendency to be oriented in a substantially horizontal direction. If the compression of the mixture in the narrow lateral chamber parts is carried out solely in the known manner in a vertical direction, that is, in a direction at right angles to the direction of the fibers, the substantially horizontal orientation of the fibers in the compressed mixture will remain unchanged. Because of the small width or thickness of the finally molded wall portion, this portion will therefore have a very low breaking strength. If, however, the molding of these wall portions is carried out in accordance with the invention, it has been found that by first exerting a strong lateral pressure upon the molding mixture for these wall portions, the fibers in this mixture will turn from their original horizontal orientation partly to an inclined and partly to an upwardly curving shape and become interlocked or felted to each other. This interlocking or felting effect is further increased by the subsequent compression of the laterally precompressed material in the vertical direction. By numerous tests it has been found that the breaking strength of the narrow wall portions which are produced according to the invention far exceeds that of similar wall portions which are solely produced by vertical compression.

Of course, the shape and construction of the mold according to either of the embodiments of the invention as previously described may be considerably modified in accordance with the particular shape and structure of the desired molded product. While in the previous description it is assumed that the molded element consists of a plate with a main central part of a considerable width but small thickness which is provided along each of its opposite sides with a thin wall of a relatively great height, the front and rear sides of this element are not made of any greater thickness or height than the main central part. In this case, the two dies 6 are not connected to each other but movable independently of each other. If, however, the molded element should have along all of its edges a continuous rim or wall either of a uniform thickness and/or height or of a different thickness and/or height at different sides, a single framelike die 6 may be provided. The stationary frame wall 7 must then be provided with recesses in all four of their inner sides in which lateral dies 8 are movable.

The molded element also does not need to be of a symmetrical shape like that of the element as shown in the drawings, but it may, for example, be provided only on one side or only on a part of one side with a thin wall or wall portion of a greater height or this thin wall or wall portion may vary in thickness and/or height in its longitudinal direction. This may then require two or more independent lateral dies in the same frame wall 7. It is further possible according to the invention to produce molded elements of a more intricate shape by employing several independently movable lower dies in place of the single central die 4 as shown in the drawings. These individual dies are then designed to produce adjacent horizontal molded parts of different thicknesses and the compression stroke of each of these dies is made of a length in accordance with the desired rate of compression of the respective molded part or of all horizontal parts. Furthermore, the upper die 1 may be designed so as to move from above for a certain distance between the stationary frame walls 7. This die 1 may then be provided, for example, with a projection on its lower side the outer dimensions of which correspond with the inner dimensions between the frame walls 7 and the lower surface of which forms the pressure surface which engages upon the molding mixture 2 in the mold chamber, while the outer ends of the upper die 1 by engaging upon the upper surfaces of the frame walls 7 limit the depth to which the projection of die 1 can pass into the mold chamber and compress the molding mixture 2 therein from above.

Although my invention has been illustrated and described with reference to the preferred embodiments thereof, I wish to have it understood that it is in no way limited to the details of such embodiments but is capable of numerous modifications within the scope of the appended claims.

Having thus fully disclosed my invention, what I claim is:

1. A mold for press-molding elements from a mixture of fibrous material and a binder in which each of the elements comprises a plate-shaped main portion and at least one wall portion having a width considerably smaller than that of said main portion and projecting integrally therewith from one side of the latter normal thereto, said mold comprising a frame having wall means having an inner face defining the upper part of a mold chamber, an upper and a lower surface, and said mold defining at least in one portion of said wall means a recess extending from said inner face into said one wall portion of said wall means and having a lower guide face upwardly spaced from said lower surface; a lateral die in said recess, said lateral die having a front face and being guided on said lower guide face for movement between a position retracted into said recess and an advanced position in which said front face is flush with the inner face of said one portion of said wall means a first lower die located in said frame and having an upper face and a pair of side faces one of which faces said one portion of said wall means and being spaced from the inner face of said wall means a distance equal to said width, of the wall portion of said element said first lower die being movable between a lower filling position and an upper compressing position in which said upper face thereof is upwardly spaced from said recess, said one side face of said first lower die defining together with said front face of said lateral die a downward extension of said upper part of said mold chamber in communication with the latter when said lower die is in said filling position; a second narrow lower die sandwiched between said one side face of said first lower die and the inner face of said one portion of said wall means of said frame and having a top face, said narrow lower die being movable independently from said first lower die between a lower inactive position in which said top face thereof is flush with said lower guide face and an upper compressing position; and an upper die having a bottom face and being movable relative to said frame between an open position remote from said upper surface of said frame to permit filling of said upper part of said mold chamber and said extension thereof with the mixture to be molded and a closed position in which said bottom face engages said upper surface of said frame, whereby after filling the mold chamber and the extension thereof with said mixture and moving said upper die to said closed position and thereafter said first and second lower dies and said lateral die to their respective compressing and advanced positions, the mixture in said upper mold chamber will be compressed in one direction and the mixture in said extension will be compressed in two directions transverse to each other.

2. A mold as defined in claim 1 in which said frame is mounted in a fixed position and said lower dies are movable upwardly between said wall means to compress said mixture in said chamber after said lateral die has compressed said mixture in and from said recess to the final thickness of said molded wall portion.

3. A mold as defined in claim 2, further comprising common means for moving said lower dies upwardly, said second lower die being secured to said common means, and means interposed between said first lower die and said common means for initially retarding upward compressing movement of said first lower die relative to the upward movement of said common means together with said second lower die.

4. A mold as defined in claim 3, in which said common means comprise a plate to which said second lower die is secured, said retarding means comprising a plurality of compression springs interposed between said plate and said first lower die so that the compressing movement of said first lower die at first proceeds more slowly than that of said second lower die until said springs are fully compressed and said plate abuts directly against said first lower die.

5. A mold as defined in claim 1, wherein said recess has an upper face downwardly spaced from said upper surface of said frame, said lateral die being guided between said lower guide face and said upper face of said recess, and said upper face of said first lower die being in said lower filling position downwardly spaced from said upper face of said recess at such a distance so that during the filling operation said chamber extension may be completely and uniformly filled.

* * * * *